Oct. 8, 1957    H. KERNEN    2,808,951
BOX-EMPTYING MECHANISM FOR FRUIT-GRADERS
Filed May 23, 1955    4 Sheets-Sheet 1

Oct. 8, 1957      H. KERNEN      2,808,951
BOX-EMPTYING MECHANISM FOR FRUIT-GRADERS
Filed May 23, 1955      4 Sheets-Sheet 2
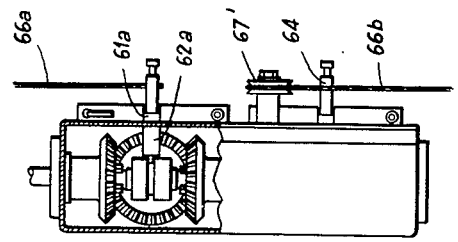
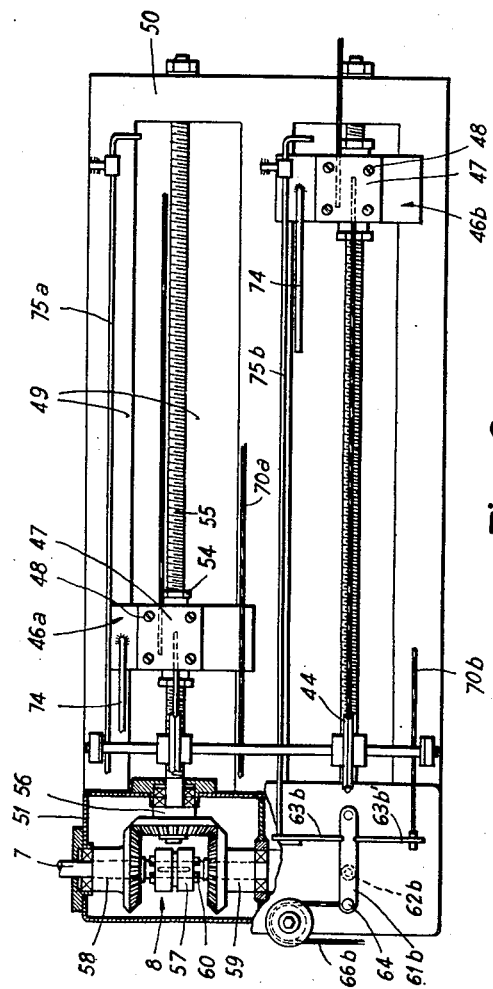
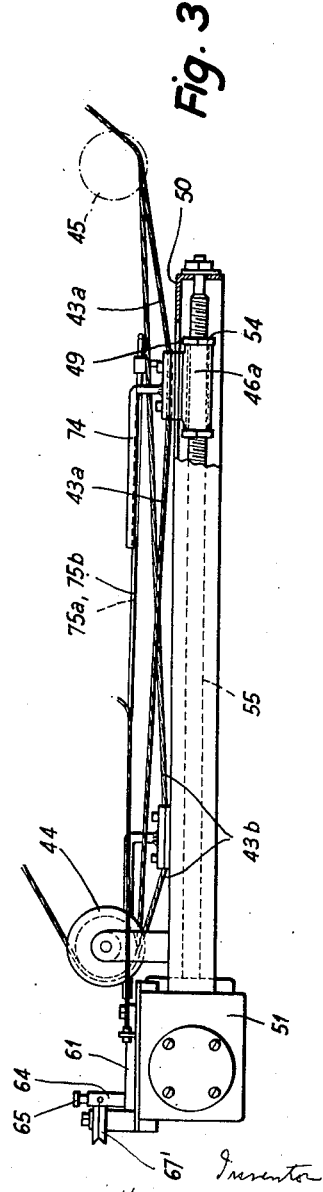

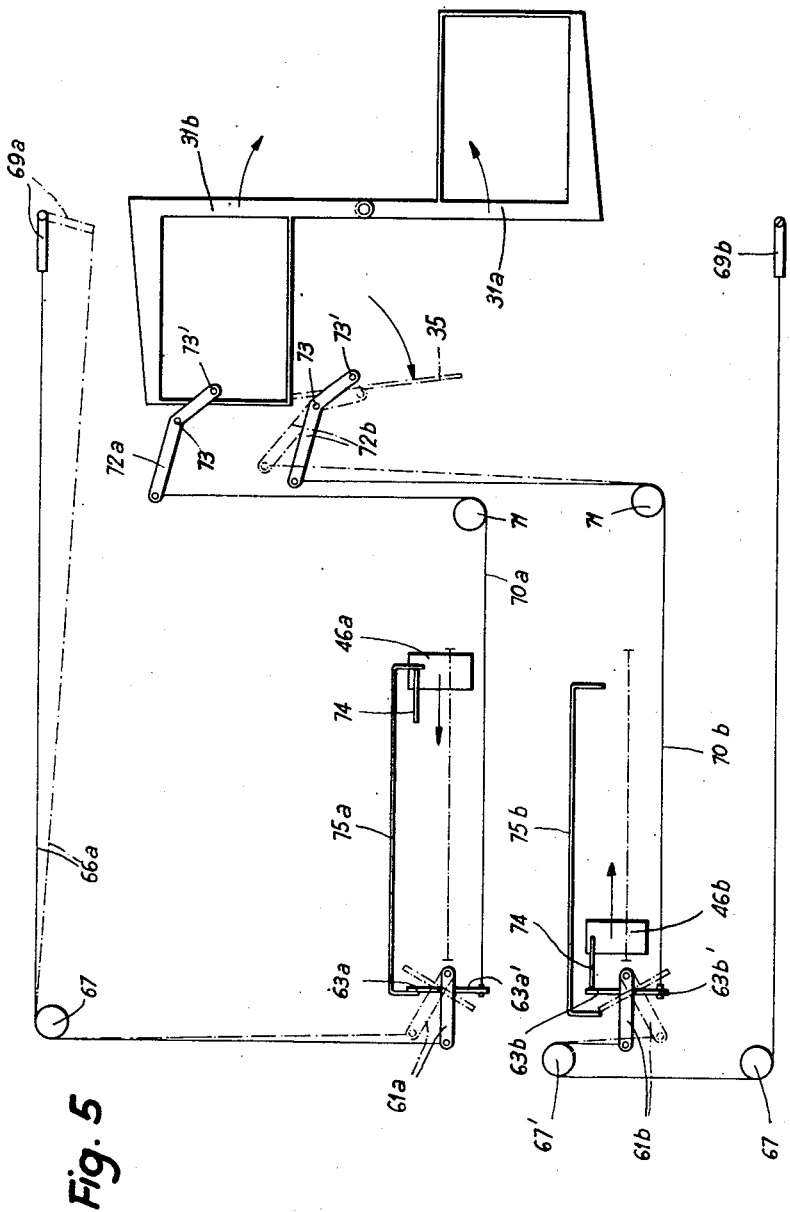

Oct. 8, 1957  H. KERNEN  2,808,951
BOX-EMPTYING MECHANISM FOR FRUIT-GRADERS
Filed May 23, 1955  4 Sheets-Sheet 4

Inventor
Hans Kernen
by Stevens, Davis, Miller & Mosher
his attorneys

United States Patent Office 2,808,951
Patented Oct. 8, 1957

2,808,951
BOX-EMPTYING MECHANISM FOR FRUIT-GRADERS

Hans Kernen, Bern, Switzerland

Application May 23, 1955, Serial No. 510,330

7 Claims. (Cl. 214—314)

So far, fruit has been poured mostly by hand from the boxes on to the grading table of fruit-graders, whereby the fruit was badly battered. Furthermore, primitive devices are known which imitate such pouring by hand.

The main object of my present invention is to provide a box-emptying mechanism for fruit-graders which prevents the fruit from becoming battered and bruised.

Figure 1:
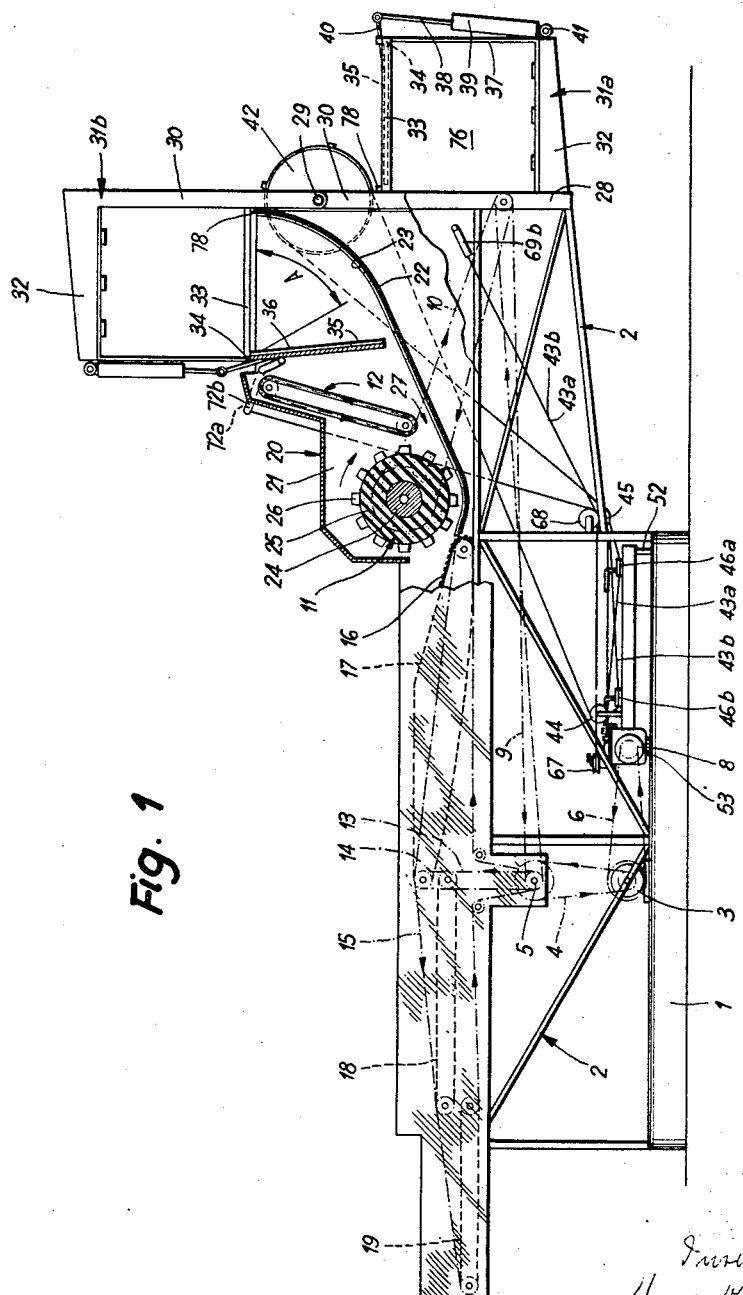
Figure 6:
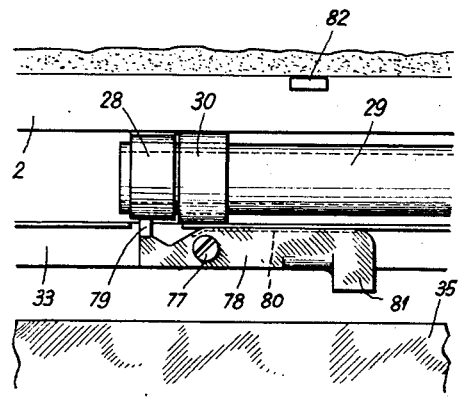
Figure 7:
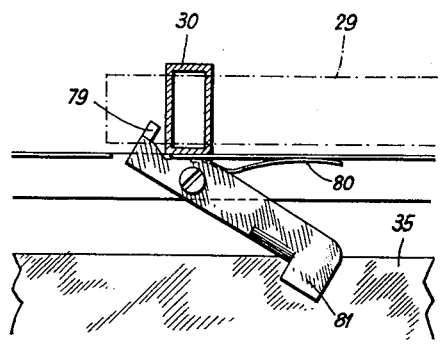
Figure 8:
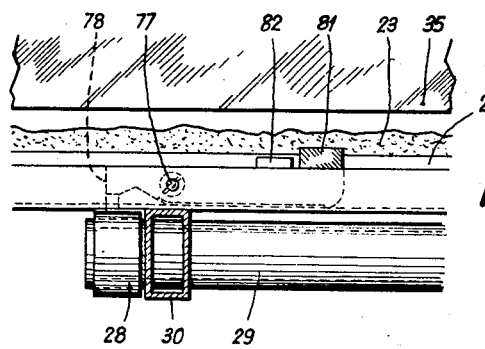

One form of the invention is shown, by way of example, in the accompanying drawings in which:

Fig. 1 shows an elevation, partly in longitudinal section, of the mechanism disclosed by my present invention, attached to a grading table, Figs. 2 to 4 show a top plan view, an elevation and a side elevation respectively, of a portion of a tilter-driving device and an appurtenant control device, Fig. 5 illustrates a scheme which shows the mode of operation of the control device, and Figs. 6 to 8 depict three different operating positions of a pawl for bolting the pivotable lid of the tilter.

In the left-hand portion of Fig. 1 is shown a fruit-grading machine, and in the right-hand portion is shown the mechanism according to my present invention, by means of which the boxed fruit is emptied into said machine. On a base plate 1 is mounted a machine-frame 2 welded of iron shapes. An electric motor 3 via a chain drive 4 drives an intermediate shaft 5, and, via a second chain drive 6, the input shaft 7 (Fig. 2) of a change-over clutch 8. Countershaft 5 through chain drives 9 and 10 drives two tandem conveyor rollers 11 and two appurtenant endless belts 12 which are trained over an upper and a lower drum, and through further chain drives 13 to 15 said countershaft drives three transport belts 17 to 19 which form a grading table as known in the art. Said belts 17 to 19 are disposed rearwardly of roller 11 in staggered arrangement and are provided with cross-slats 16.

One of the rollers 11 and a belt 12 are disposed in a chute 20 which is approximately half as wide as the belts 17 to 19. Each of the two adjacent chutes 20 has two sidewalls 21 and a bottom 22, and these components are padded with sponge rubber 23 on their inside and upper side respectively. The upper portion of bottom 22 is of special shape, as described later. The downwardly adjoining portion of bottom 22 is inclined and extends below roller 11 concentrically therewith and then slightly upwardly to a point above belt 17. Roller 11 comprises a solid core 24 and a thick sponge-rubber jacket 25 bonded to the latter. A plurality of sponge-rubber pegs 26 project from jacket 25 but do not extend downwardly to bottom 22. Belt 12 is disposed in box 20 immediately in front of roller 11, and also is padded with sponge rubber, and runs upwardly at an angle on the side remote from roller 11. Belt 12 functions to gently loosening the fruit accumulating in front thereof, so that the fruit, for example apples, slip one by one through the gap 27 and are at once engaged by roller 11.

On the endface of the mechanism are provided two pairs of posts 28 which are parts of frame 2 and at their upper semi-cylindrical ends comprise bearings for two tilter shafts 29. To each shaft 29 are secured two arms 30 of a welded tilter structure 31a and 31b respectively, and the latter further comprises a platform 32, a cover frame 33, a lid 35 padded with sponge rubber 36 on the underside, said lid being pivotable, on the side opposite the arms 30, on an axle 34 which is parallel to the tilter shafts 29, a rigid brace 37 between platform 32 and frame 33, and an oil or air piston brake of which the members 38, 39 are pivoted to an extension 40 of lid 35 or, respectively, to a boss 41 of platform 32. On each of the adjacent ends of the two tilter shafts 29 is rigidly mounted a cable sheave 42.

In Fig. 1, tilter 31a is in its initial or inoperative position, and tilter 31b is in the pouring position. The two tilters have independent drives to which belong the tilter shafts 29 and the cable sheaves 42. Those parts and portions of the two drives and of the appurtenant control devices, which belong to tilter 31a are designated in the drawings by an "a" in the reference numeral, and those belonging to tilter 31b are designated by a "b." The construction of the driving and control devices is similar for both tilters.

Over cable sheave 42 of tilter 31a is trained an endless steel cable 43a which through clamping screws or the like is rigidly connected to sheave 42. The two sections of cable 43a are trained over idling rollers 44 and 45 respectively, to a carriage 46a to which are clamped the two cable ends by means of a clamping plate 47 and screws 48. Carriage 46a is movable on two rails 49 in the longitudinal direction of the mechanism. The two rails 49 are formed on a double frame 50 which is rigidly connected to the casing 51 of clutch 8 and, together with said casing is secured to base plate 1 by means of bolts 52 and 53. To both ends of carriage 46a are secured nuts 54 which engage a threaded spindle 55, the latter being axially immovably but rotatably mounted in frame 50 and casing 51. To that spindle end which projects into casing 51, is rigidly secured a bevel gear 56 which constantly is in mesh with two bevel gears 58, 59 which are loosely rotatable on inlet shaft 7 at both sides of a coupling box 57. The latter is movably splined on shaft 7 and at both ends has claws 60 which alternatively may be engaged to claws of one or the other of the two bevel gears 58, 59 by moving box 57 by means of a change-over lever 61a, 62a mounted on casing 51. Any known device, such as a snap device, is provided for securing the lever and, thus, the coupling box 57 against unintentional actuation. To lever portion 61a which is situated outside of casing 51, is welded a cross-arm 63a, 63a' which, when clutch 8 is disengaged, for example in the intermediate position of lever 61a, 62a shown in Fig. 5, extends at right angles to the path of carriage 46a. To a pin 65 secured to the free end of lever member 61a is fixed, by means of a clamping screw 65, a cable 66a (Fig. 5) which is trained over idling rollers 67, 68 (see also Fig. 2) to an actuating knob 69a which is pivoted to the outside of the cowling of frame 2 in the neighbourhood of tilter 31a. It is to be noted that cable 66b is trained over an additional idling roller 67' since the change-over levers are not symmetrical, the knobs 69a, 69b however being symmetrically arranged with respect to the longitudinal median plane of the mechanism. To cross-arm 63a' is secured a wire cable 70a which is trained over an idling roller 71 (Fig. 5) to a sensing lever 72a. The latter in Fig. 5 is shown in too high a position in order to avoid it being covered by the sensing lever 72b which is shown in its correct position with respect to tilter 31b and its lid 35, said tilter being in the tilting position. The two sensing levers are loosely mounted on the same axle 73 which extends between the two boxes 20. The two sensing levers comprise feeling pins 73' against which may abut the respective lid 35 when the latter approaches its position of maximum opening when the tilter has been raised and turned from its position of rest through 180°, as shown in Figs. 1 and 5 for the pivotable lid of tilter 31b. The respective sensing lever (72b in Fig. 5) then is swung clockwise. By means of the appurtenant cable (70b) the respective change-over lever (61b, 62b) is swung anticlockwise (Figs. 2 and 5). The appurtenant spindle 55 thereby is rotated so that the appurtenant carriage (46b) is moved away from the change-over lever to the right (Figs. 1 to 3 and 5), the respective tilter (31b) thus being swung back to its position of rest through the appurtenant cable (43b). Clutch 8 then is thrown out in that a rod 74 secured to the carriage (46b) abuts against one of two bent-off end portions of a linkage (75b) movable in parallel relation with the spindles 55, whereby said linkage is moved and through its other end portion entrains the cross-arm (63b) so far that the change-over lever (61b, 62b) is moved to its intermediate position. Rod 74 also acts to throw out the respective reversing clutch when the respective tilter has attained its pouring position. When initiating the raising and tilting movement of, say, tilter 31a by the actuation of handle 69a, the lever member 61a and its arms 63a, 63a' has been swung to the position shown in Fig. 5 by dot-and-dash lines. Carriage 46a then moves to the left. At the end of such latter movement, i. e. when tilter 31a has attained its pouring positions, rod 74 of carriage 46a abuts against cross-arm 63a whereby lever member 61a is returned to its intermediate position which in Fig. 5 is shown by solid lines, and the respective clutch 8 is thrown out. The movement of swinging the tilter downwardly is independently initiated only when, as already described above, the respective pivotable lid attains its position of maximum opening.

It is obvious from the foregoing description that when one of the tilters 31a, 31b is swung high by actuating handle 69a or 69b, the operations of stopping same in its pouring position, swinging it back to its initial position as soon as its pivotable lid has attained its maximum degree of opening, and stopping same in its initial position take place automatically. One person may therefore operate both tilters, so much the more as the charging space 76 of each tilter in the initial position is situated at a convenient working height. Such convenience was obtained by disposing the tilter shafts 29 some distance below the upper edge of chute bottom 22, and such distance is equal to that between said shafts and the closed pivotable lid 35. Therefore, each box, when being swung high through 180° also is raised for an amount equal to the height of charging space 76 plus double said distance. The attendant removes the empty box from space 76, moves a full box into the latter, and actuates the appurtenant grip 69a or 69b. In this time, the other tilter will have finished its work and have returned to its initial position so that it may be charged again.

In Figs. 6 to 8 is shown a device which, in each tilter 31a, 31b opposes an opening action of pivotable lid 35 until the tilter has attained one or the other terminal position, i. e. its initial position or pouring position. The construction and mode of operation of said device is similar for the two tilters. Figs. 6 to 8 show a top plan view of the device, Fig. 6 when the tilter is in its initial position, and Fig. 7 when the same is in the pouring position.

A pawl 78 is mounted opposite one of the tilter arms 30 on the upper side of lid frame 33 by means of a screw 77 which serves as pivot. As shown in Fig. 6, said pawl through a tail portion 79 abuts against the contiguous post 28 so as to be positioned parallel to lid frame 33 against the action of a leaf spring 80 secured to the pawl and supported on frame 33, whereby said pawl withdraws its forward bolting lug 81 from that edge of the lid-frame which is opposite lid pivot 34 (Fig. 1). When the tilter is swung high, tail portion 79 first remains leaning up against post 28 while axle pin 77 moves with the tilter. Thereby leaf spring 80 is enabled to swing pawl 78 into the position shown in Fig. 7, in which its lug 81 is situated above the adjacent edge of the pivotable lid and keeps the latter closed. This position of pawl 78 is maintained until the tilter is swung high almost to its highest position. Pawl 78 then, through its sideface adjacent said lug, abuts against a stop 82 which surmounts the upper edge of chute bottom 22 (Fig. 1), whereby the pawl is swung back against the action of spring 80 so that its lug releases lid 35.

Lid 35 then is opened under the weight of the fruit present in the overturned box. Piston brake 38, 39 however acts to prevent lid 35 from opening too quickly. The free edge of lid 35 moves closely along the sponge-rubber padding of a portion of the chute bottom which is curved on an arc A of approximately 60° along an imaginary cylindrical shell of which the axis coincides with lid pivot 34 when the tilter has been swung high. Said chute-bottom portion is downwardly adjoined by a portion which is inclined approximately 30° with respect to the horizontal and then merges into the portion mentioned above which is concentric with roller 11. The fruit proceeds along lid 35, and the major portion of the fruit gradually moves downwardly to the loosening belt 12 when lid 35 nearly has been entirely opened and has initiated again the swing-back movement of the tilter by means of the sensing lever 72a or 72b, and slowly rises again with the tilter. Belt 12 moves the fruit which collect at its lower end, slowly upwardly while fruit pass freely through gap 27 across the entire width of the belt, the fruit subsequently being seized by roller 11 and moved thereby on to belt 17.

Extended practical tests have shown that even extremely sensitive fruit may be handled with the mechanism of my invention, without being damaged in any way. The mechanism furthermore has a high output and is not susceptible to trouble.

Various changes could be made in the form of the invention described, without leaving the scope of the invention. For example, in lieu of the purely mechanical control device (Fig. 5), there could be provided a hydraulic or electrical control device. For very small establishments, the motor drive and control device could be omitted.

I claim:

1. A box-emptying mechanism for a fruit grading machine having a grading table, comprising at least one padded chute having an upper and lower chute portion and having a bottom formed with a curved upper portion and an inclined lower portion leading to the grading table, fruit conveying means disposed in the lower chute portion, at least one box tilter adapted to house a box of fruit, means pivotally mounting the box tilter at one side for vertical swinging movement through approximately 180° from a horizontal loading position in front of and below the upper bottom portion of the chute to a horizontal dumping position above the upper bottom portion, a lid pivoted to the box tilter at the side of the box tilter opposite to the pivoted side thereof, brake means operatively connected between the box tilter and the lid and means permitting the lid to swing open against the action of the brake means as the box tilter reaches its final dumping position with the free edge of the lid remote from its pivot axis first moving along the upper bottom portion and then gradually moving away from the lower bottom portion to permit the fruit to roll one by one toward the fruit conveying means.

2. A box-emptying mechanism as claimed in claim 1, wherein said box tilter includes a frame having upstanding arms on one side, a rotatable tilter shaft extending horizontally in front of and a distance beneath the upper end edge of the upper bottom portion and on which the arms are fixed, the distance between the tilter shaft and said upper end edge being equal to the distance between the tilter shaft and the box lid, when the box tilter is in its loading position, so that each fruit box when tilted through 180° also is lifted for an amount equal to the height of the tilter's charging space plus double said distance.

3. A box-emptying mechanism as claimed in claim 1, wherein said fruit conveying means includes an endless padded belt positioned in an inclined position in the lower chute portion and running over a pair of vertically spaced idling rollers, said lower idling roller being spaced above the bottom of the chute at a sufficient distance to create a gap for passing the fruit one by one over the lower bottom portion of the chute, and said belt having an outer reach which forms a barrier and moves downwardly.

4. A mechanism as set out in claim 2, in which there is provided a tilter drive, the latter comprising a control device for throwing in the drive by hand, said drive being adapted to be thrown out by the tilter when the latter attains its dumping position, to be changed-over by said lid when the latter attains its maximum degree of opening, and to be thrown out again by the tilter when the latter attains its initial position.

5. A mechanism as set out in claim 4, comprising a cable sheave fixed to the tilter shaft, an endless cable secured to said sheave, an actuating carriage drivingly connected to said sheave through said cable, an electric motor, a reversible claw clutch, a threaded spindle and a rail track, said carriage being reciprocatable on the latter through said motor by means of said clutch.

6. A mechanism as set out in claim 4, in which the coupling box of said clutch and a reversing lever connected thereto are adapted to occupy three operational positions, the intermediate position being the idling position in which an arm of said lever stands at right angles to the track of the carriage, the latter then being at the track-end remote from said lever and the tilter being in its initial position, while in the operational position for swinging the tilter from the initial position into the dumping position one end of said arm is inclined towards a pusher rod secured to the carriage, said rod acting on said arm end on attaining the dumping position and thereby disengaging the clutch, the latter being brought into the position for swinging back the tilter by the lid attaining its maximum degree of opening and through a sensing lever and a cable acting on the other end of said arm, and said clutch being again disengaged when the tilter again reaches its initial position through said push rod and a linkage acting on the first-mentioned end of said arm.

7. A mechanism as set out in claim 2, comprising a pawl pivoted to the lid frame of the tilter, and a spring adapted to swing out the pawl in all the intermediate tilter positions so that the pawl through one of its ends counteracts any opening movement of the lid, whereas the pawl in the initial and dumping positions abuts against fixed stops and releases the lid.

References Cited in the file of this patent
UNITED STATES PATENTS

| | | |
|---|---|---|
| 2,062,503 | Case | Dec. 1, 1936 |
| 2,397,129 | Davis | Mar. 26, 1946 |
| 2,577,091 | Porter | Dec. 4, 1951 |
| 2,702,138 | Getty | Feb. 15, 1955 |
| 2,727,641 | Tomkins | Dec. 20, 1955 |